(12) United States Patent
Maguire

(10) Patent No.: US 8,104,972 B2
(45) Date of Patent: Jan. 31, 2012

(54) BEARING ARRANGEMENT

(75) Inventor: Alan R. Maguire, Derby (GB)

(73) Assignee: Rolls-Royce PLC, London (GB)

( * ) Notice: Subject to any disclaimer, the term of this patent is extended or adjusted under 35 U.S.C. 154(b) by 646 days.

(21) Appl. No.: 12/232,585

(22) Filed: Sep. 19, 2008

(65) Prior Publication Data

US 2009/0103843 A1 Apr. 23, 2009

(30) Foreign Application Priority Data

Oct. 20, 2007 (GB) .................................. 0720628.7

(51) Int. Cl.
*F16C 41/02* (2006.01)
*F01D 3/04* (2006.01)
(52) U.S. Cl. .................... 384/556; 384/563; 415/107
(58) Field of Classification Search .................. 384/556, 384/563, 517, 624; 415/105, 107
See application file for complete search history.

(56) References Cited

U.S. PATENT DOCUMENTS

| | | | |
|---|---|---|---|
| 4,309,144 A * | 1/1982 | Eggmann et al. | 415/105 |
| 4,884,942 A | 12/1989 | Pennink | |
| 5,735,666 A | 4/1998 | Johnston | |
| 5,977,677 A * | 11/1999 | Henry et al. | 310/90.5 |
| 2009/0103849 A1 * | 4/2009 | Maguire | 384/624 |

\* cited by examiner

*Primary Examiner* — Thomas R Hannon
(74) *Attorney, Agent, or Firm* — Oliff & Berridge, PLC

(57) ABSTRACT

A number of machines such as gas turbine engines have asymmetric axial loading along a shaft (2, 3, 4). In order to accommodate for this asymmetric loading, known as an end bearing load, a load share bearing (103) is typically provided. However, specifying the fixed bearing (11, 12) becomes increasingly difficult as space and weight considerations are taken into account. In such circumstances providing a combination of a fixed bearing (11, 12) and a load share bearing (103) to achieve an acceptable bearing end load capacity is more acceptable. The proportion of the combination provided respectively by the fixed bearing and the load share bearing can be varied dependent upon operational stage in order to achieve more efficient operation.

17 Claims, 3 Drawing Sheets

BEARING ARRANGEMENT

The present invention relates to bearing arrangements and more particularly to methods and structures for bearing arrangements utilised in gas turbine engines or a machine having asymmetric axial loading upon shafts.

In a number of situations it is desirable to provide a bearing arrangement and in particular a bearing end load management arrangement for the control of axial thrust forces on location bearings. These location bearings may be about a shaft within an aero engine or similar machine. It will be understood that it is important to ensure that the bearing remains within its operational capabilities to ensure efficient operation of the machine such as a gas turbine engine as well as achieve acceptable life expectancies for the bearings in use.

FIG. 1 of the attached drawings illustrates a typical prior load bearing arrangement utilised in a gas turbine engine 1. The engine 1 includes shafts 2, 3, 4 upon which respectively low pressure, intermediate pressure and high pressure compressor and turbine combinations are associated. Of particular concern is the asymmetric axial loading on the low pressure shaft 2 between a low pressure compressor fan blade set 5 and a low pressure turbine set 6. The low pressure turbine 6 generates a turbine force 7 in the direction of the depicted arrowhead whilst the low pressure compressor fan set 5 generates a fan force in the direction of arrowhead 8 generally opposite to that of the turbine force 7. The turbine force 7 is generally greater than the compressor fan force 8 and therefore there is asymmetric loading on the shaft 2. The asymmetric axial loading on the shaft 2 is balanced by a piston 9 which draws compressed air from a space 10 behind the compressor fan blade set 5. The piston 9 is associated with the shaft 2 through a load share bearing and applies a balancing load to compensate for the differences in the turbine force 7 and the fan force 8. Generally the piston is associated through a rotating seal which can produce inefficiencies and pressurisation leakage. Such arrangements can compensate for the end load due to the differential in the forces 7, 8. The purpose of the piston 9 as indicated is to bring the axial load within the capabilities of location bearings 11, 12. As indicated the piston or pistons 9 are associated with the shaft through an appropriate coupling 13 within a front bearing housing 14. In any event, the air bled into the piston 9 creates a high pressure space 15 and results in losses of compressed air to the overall engine 1. It is typical for the location bearings 11, 12 to be located within a casing 16 as part of inter-shaft bearings as depicted in FIG. 1. Generally, the intercasing 16 also accommodates a gearbox 17. In any event, the intermediate location bearing 12 also is subject to load. The intermediate shaft 3 between the compressor 18 and the turbine 19 is generally balanced and neutral but the intermediate pressure location bearing 12 experiences similar end loads as the low pressure location bearing 11 due to its location.

Within a gas turbine engine there is an inherent desire to improve engine performance. Core parts of more recent engines are generally designed of reduced size and operated at increasingly high pressure ratios to maximum temperature within limits of the materials available. Such approaches increase the pressure drop across the low pressure turbine which then results in an increased rearwards axial load so that the resultant force 7 is greater than the force 8. In order to balance this end load 20 the bleed pressure taken from the high pressure space 10 is increased. Unfortunately such an approach results in a reduction in efficiency which may out weigh the additional thermo dynamic cycle improvements provided by smaller engine core dimensions.

An alternative to utilisation of pressurisation or another mechanism for applying load to the load share bearing is to utilise a larger location bearing at the gearbox 17. This will reduce the amount of load required by the low pressure balance piston 9. However, this has a limited benefit as the intermediate gearbox bearings operate at relatively high speeds and the centrifugal force contribution on bearing life will be the dominant effect. In a typical three shaft gas turbine engine the maximum bearing diameter within the intermediate gearbox is limited to about 320 mm resulting in a life limiting effect. A further approach would be to provide a large low pressure location bearing in the bearing housing 14. Such an approach would allow replacement of the intermediate gearbox bearing with a roller bearing. However, a large bearing, possibly in the order of 550 mm, would be required to take the full end load without the need for balancing pistons 9 and load share bearings. Such a large bearing would add significantly to engine weight and therefore limit applicability particularly with regard to aero space applications. It will also be appreciated that such a large bearing may also alter other significant characteristics of the engine in use.

In accordance with aspects of the present invention there is provided a method of operating a bearing arrangement for a shaft subject to axial loading over an operating cycle, the bearing arrangement comprising a fixed bearing and a load share bearing to act in combination to accommodate the axial load, the load share bearing associated with a load mechanism capable of varying the load applied between the load share bearing and the fixed bearing, the method characterised by the steps of determining a stage of the operating cycle and determining the axial load and varying the axial load applied to the load share bearing.

Preferably, the load applied to the load share bearing is one of a plurality of fixed load values.

Preferably, the load mechanism incorporates a piston to apply the load to the load share bearing.

Preferably, the bearing arrangement incorporates a sensor to determine the stage of the operating cycle.

Preferably, there is a fixed relationship between the stage and the load applied by the load mechanism.

Alternatively, there is a variable relationship between the stage and the load applied by the load mechanism dependent upon the sensor determining actual axial load upon the shaft.

Preferably, the method comprises the step of applying at least half of the total load to the load share bearing.

Alternatively, a second load share bearing is present on the shaft and the method comprises the step of applying at least one third of the total load on each load share bearing.

Preferably, an aircraft engine comprises the bearing arrangement and the aircraft engine undergoes any one or more of the following stages ground/idle and taxi and/or take off and/or climb and/or cruise and/or descent and/or reverse thrust, the method comprising the step of varying the load on the load share bearing according to the engine stage.

In another aspect of the present invention there is provided a bearing arrangement for a shaft subject to axial loading over an operating cycle, the shaft presented upon a fixed bearing and a load share bearing to accommodate in combination the axial loading, the load share bearing associated with a load mechanism to vary the load applied to the load share bearing, the arrangement characterised in that the load mechanism is associated with a controller to specifically vary the load applied to the load share bearing and the proportion of the combination with the fixed bearing to meet axial load for a particular stage of the operating cycle.

Preferably, the load applied to the load share bearing is one of a plurality of fixed load values.

Preferably, the load mechanism incorporates a piston to apply the load to the load share bearing.

Preferably, the bearing arrangement incorporates a sensor to determine the stage of the operating cycle.

Preferably, there is a fixed relationship between the stage and the load applied by the load mechanism.

Alternatively, there is a variable relationship between the stage and the load applied by the load mechanism dependent upon the sensor determining actual axial load upon the shaft.

Embodiments and aspects to the present invention will now be described by way of example with regard to the attached drawings in which.

As indicated above it is known to provide a combination of a fixed bearing and a load share bearing in order to accommodate for asymmetric axial load distribution along a shaft in a machine such as a gas turbine engine. Typically, a fixed bearing provides a base end load capacity for a bearing arrangement with the load share bearing combining with that base fixed location bearing to accommodate for axial loading in use.

Figure 1:
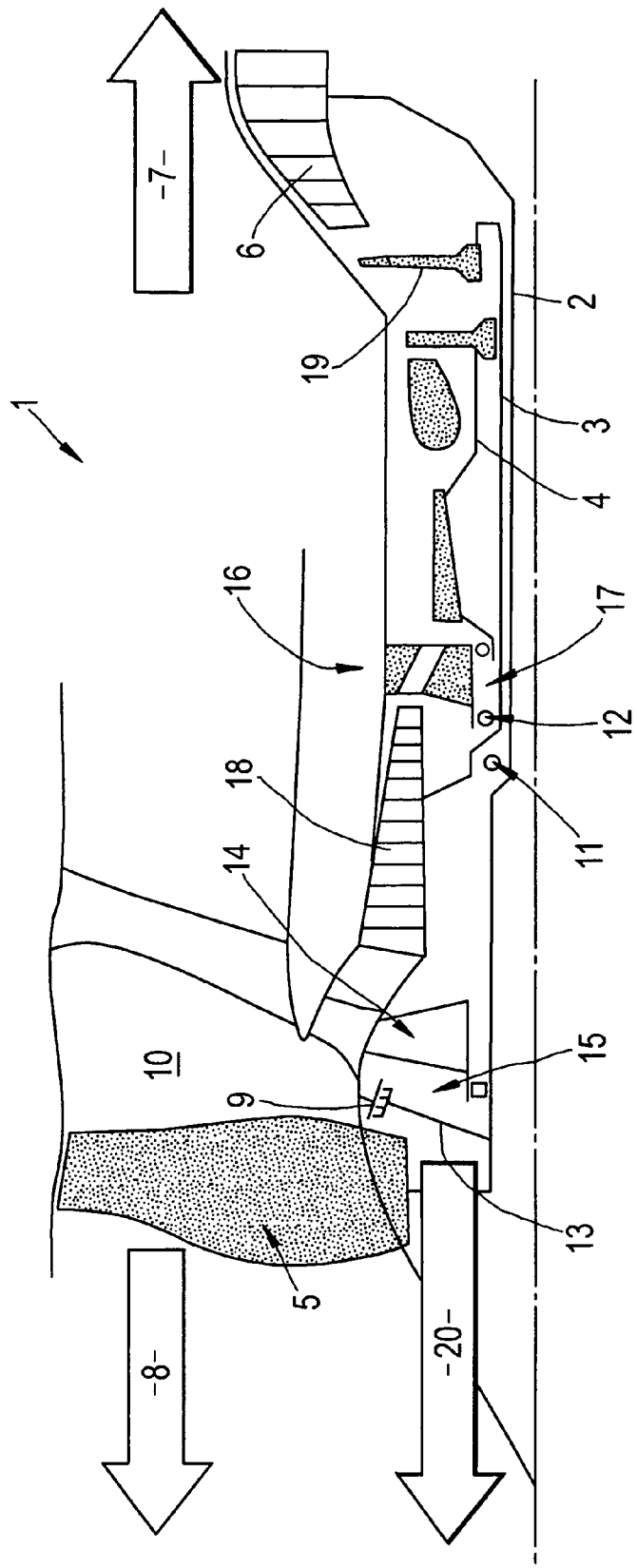
FIG. 1 is a schematic side view of a typical load bearing arrangement utilised in a gas turbine engine.
Figure 2:
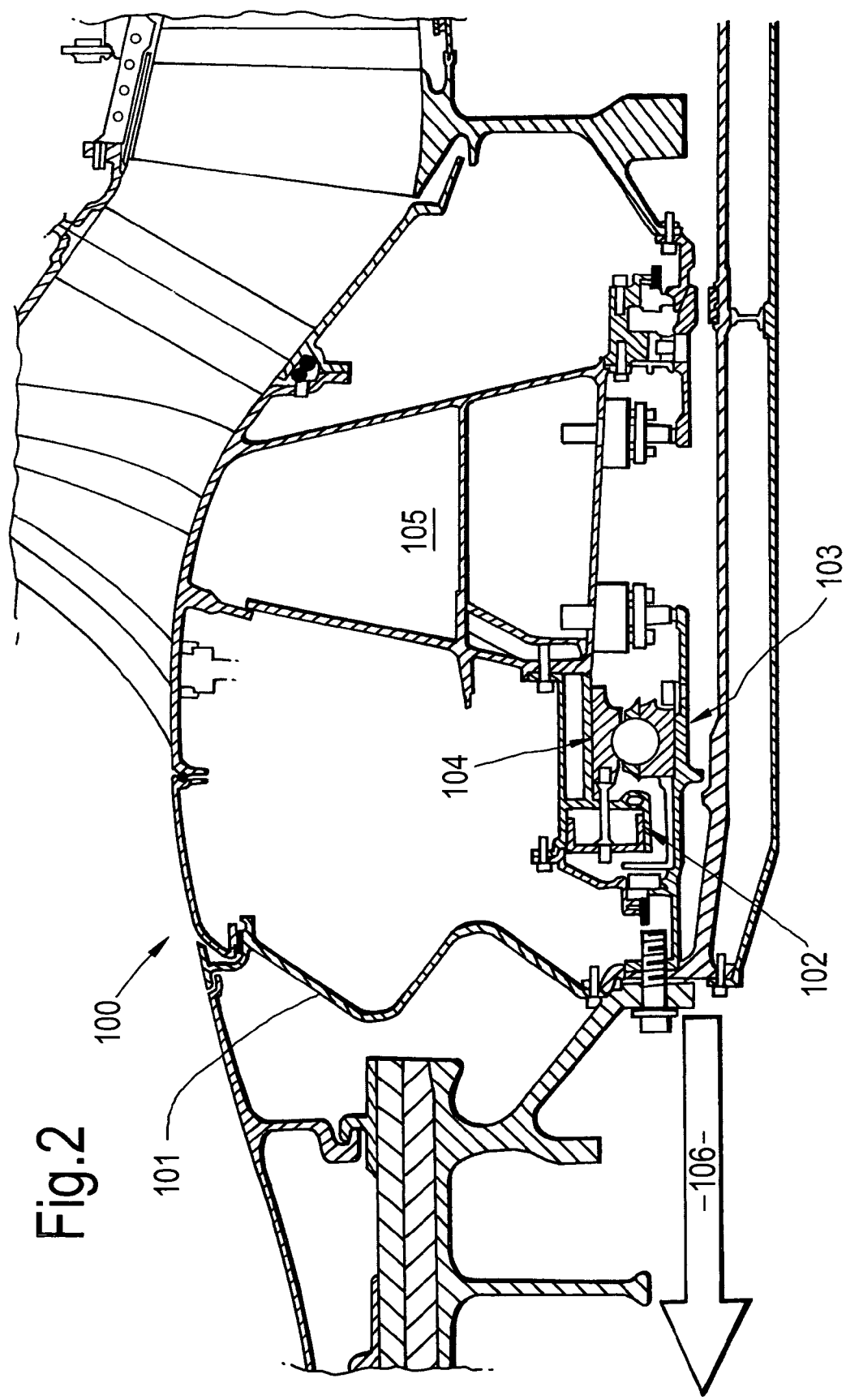
FIG. 2 is a schematic side view of a bearing arrangement in accordance with aspects of the present invention; and, FIG. 3 is a schematic illustration of a control arrangement operated in accordance with aspects of the present invention.

FIG. 2 provides a schematic illustration of a possible bearing arrangement 100 as employed in a gas turbine engine and in accordance with aspects of the present invention. The bearing arrangement 100 comprises a fixed bearing 11, 12, a load share bearing 103 and a load mechanism 102 associated with the load share bearing 103. The load share mechanism 102 comprises a hydraulic piston 102 that is provided to act upon a load share bearing 103 in order to vary the amount of the total load applied to the bearing arrangement 100 between the fixed bearing 11, 12 and the load share bearing 103. There is a slide surface 104 to allow application of the load to the bearing 103. A flexible diaphragm 101 is preferably utilised in order to act upon the load share bearing dependent upon drawn or leaked air pressure from immediately behind a low pressure compressor fan set 5. As can been seen the load share bearing 103 is located and associated with a bearing housing 105.

The hydraulic piston 102 acts as a load mechanism upon the load share bearing 103 in order to generate a force in the direction of arrowhead 106 to act as the end force for compensating asymmetric axial loading in the arrangement 100.

It will be appreciated that, as indicated above, the end load presented will vary dependent upon operational stages in an operating cycle. The asymmetric axial loading will vary dependent upon pressure differentials between for example, a low pressure turbine stage and a low pressure compressor stage in a gas turbine engine. In such circumstances the asymmetric loading is dependent upon the work provided and so will be significantly greater when high values of work are being performed by the machine or engine in comparison with idle stages. Nevertheless, sufficient bearing capacity must be provided to accommodate for both high and low asymmetric loading creating the end load. As indicated above specifying a normally over-large location bearing would add significantly to weight and so is unacceptable. Furthermore, drawing compressed air flow or otherwise creating a load when not required would lead to inefficiencies particularly with an engine where core dimensions are reduced to improve efficiency by other means.

Aspects of the present invention relate to providing an arrangement and method of operation whereby there is preferential and specific loading to allow control of the force exerted by the load share bearing 103 relative to fixed location bearings in order that the combination, that is to say the load share bearing and the fixed bearing is sufficient to accommodate axial loading differentials. The method and arrangement defines operational stages of an operating cycle and adjusts through a load mechanism such as a hydraulic piston 102 the relative proportions of the present bearing end load provided by the respective fixed bearing and the load share bearing 103. In such circumstances the efficiency reducing effects of actuating the load mechanism at too high a level when not required can be diminished.

The present invention is an active system having a feedback loop and is characterised by preferentially loading the load share bearing such that the deferential load between the load share bearing and the fixed bearing is set for particular stages of the operating cycle. Thereby the fixed and load share bearings may be optimised for their weight, cost and longevity. As indicated generally a machine incorporating a bearing arrangement will normally operate or spend most time at a steady stage such as cruise for an aircraft propulsion engine. However, bearing capacity, whether that be through a normally oversized fixed location bearing or a combination of a fixed location bearing and a load share bearing must be specified for maximum load conditions within a machine incorporating a shaft with asymmetric loading. It will be understood that due to the position of the load share bearing it operates at relatively low rotational speed and in such circumstances is designed to accommodate extra end load without significantly affecting its projected operational life. Higher speed bearings such as fixed location bearings at an intermediate gearbox will have a limited load extension capacity due to the centrifugal effects of ball bearings and as indicated variations to accommodate larger loads will result in centrifugal effects becoming self destructive of the bearing. By preferential loading of the load share bearing greater flexibility is achieved between conditions where maximum bearing end load is required such as at take off with regard to a gas turbine engine used in an aircraft and normal operational use such as during cruise from an aircraft. There must be adequate bearing capacity to accommodate for larger asymmetric loading such as at take off but in normal circumstances it is desirable to design a bearing combination which has an extended operational life.

Although an engine transitions from one operational stage to another in an operational cycle, well-known stages are defined and for these stages relative proportioning between the fixed bearing and the load share bearing are specified. In such circumstances the necessary capacity of the bearing combination in the respective operational stage is achieved by the fixed bearing and load share bearing with the variation provided essentially by deliberate setting of the hydraulic piston acting upon the load share bearing. Although the fixed bearing may be design to carry all end loading, particularly in emergency situations, it is preferable for the load share bearing to carry at least half of the total end load. Where there are two load sharing bearings and one fixed bearing on a shaft, each of the two load share bearings preferably carry at least one third of the total end load. More specifically, the table below provides examples of possible proportions between the fixed bearing and the load share bearing with regard to operation of a shaft within a gas turbine engine used for aircraft propulsion.

| Operating stage | % of max bearing end load | Fixed bearing end load | Load share bearing end load |
| --- | --- | --- | --- |
| Ground Idle & Taxi | 6%-14% | 5% +/- 2% | 5% +/- 2% |
| Take Off | 90%-100% | 30% +/- 5% | 70% +/- 5% |
| Climb | 80%-100% | 25% +/- 5% | 65% +/- 5% |
| Cruise | 21%-29% | 5% +/- 2% | 20% +/- 2% |
| Descent | 6%-14% | 5% +/- 2% | 5% +/- 2% |
| Reverse Thrust | 60%-90% | 20% +/- 10% | 60% +/- 10% |

These proportions of load between the fixed and load share bearings are intended to be an optimisation of each bearing when considering their location, ease of replacement, servicing, weight, sizing and longevity.

As can be seen at maximum take off, that is to say when asymmetric loading and therefore end load will be greatest the specification of the fixed bearing and the load share bearing will be such that typically 70% of the bearing end load will be taken by the load share bearing and 30% by the fixed bearing. In such circumstances a smaller, lighter and cheaper specification fixed bearing can be utilised with the bulk of the bearing end load therefore taken by the load share bearing. However, in normal cruise operation it will be noted that the load share bearing takes in the order of four times the load of the fixed bearing due to the load share bearing having spare "life capacity" in comparison with the fixed bearing. Furthermore, in comparison with prior arrangements it will be understood that only necessary power at that operational stage is taken to apply the load to the load share bearing to achieve capacity.

The fixed bearing has a fixed load capacity dependent upon its structural shape and configuration, material and desired in service life. The load share bearing is associated with a load mechanism. Typically, this load mechanism applies a hydraulic or pneumatic pressure to the load share bearing as required. Alternatively, direct actuators utilising electric motors or otherwise could be arranged to apply load to the load share arrangement in order to provide end bearing load to balance asymmetric axial loading. Utilisation of hydraulic or pneumatic load mechanisms is advantageous in terms of setting displacement of a piston and applying the desired level of load.

Figure 3:
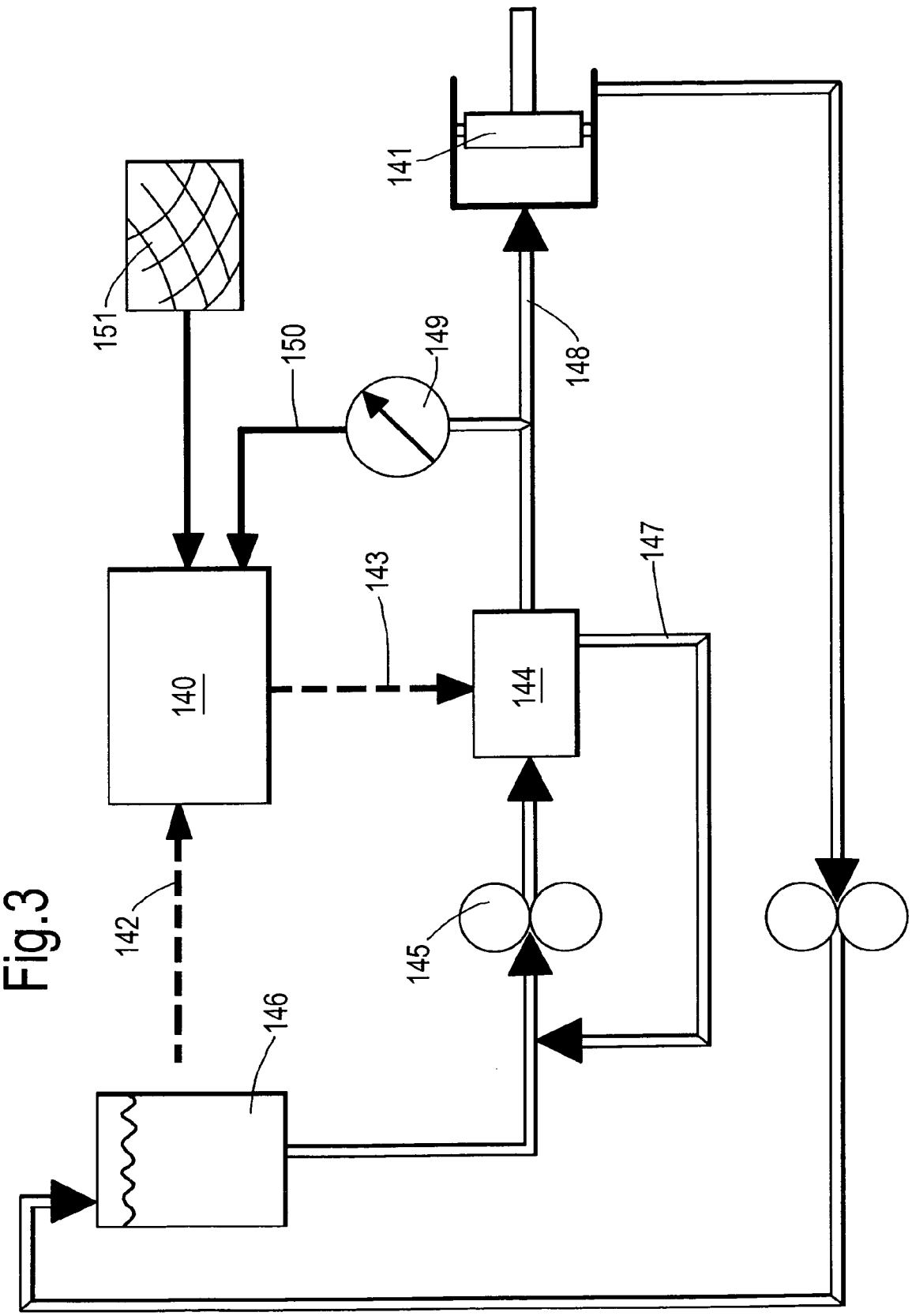

FIG. 3 illustrates schematically a control method utilised with regard to a bearing arrangement in accordance with aspects of the present invention. A control 140 is arranged to apply through an appropriate mechanism displacement of a piston 141 associated with a load share bearing. The control 140 is typically part of an overall control mechanism, for example of an electronic engine control (EEC) of a gas turbine engine, such that determination of operational stage can be determined. Within a gas turbine engine utilised with regard to aircraft propulsion, a controller may be part of a mechanism to set various parameters including thrust setting, fuel supply etc. The engine parameters or alternatively strain measurements 142 are determined or received by the controller 140. The controller 140 will then adjust the rate of hydraulic oil flow by forwarding control signals 143 to a pressure regulator 144. The pressure regulator 144 receives a supply of hydraulic oil through a pump 145 from a reservoir tank 146. The pressure regulator 144 provides hydraulic oil to the piston 141 through an appropriate supply system. Typically, a return circuit 147 is provided to account for excess pressure in the hydraulic flow beyond that necessary for current operational state. A supply conduit 148 to the piston 141 is associated with a pressure sensor 149 which provides feed back control through a feed back signal 150 to the controller 140. The controller 140 defines an objective hydraulic fluid pressure in order to displace the piston 141 and then confirm that the hydraulic fuel pressure is achieved through the sensor 145 as part of a feed back controller/loop. The defined hydraulic fluid pressure will determine the load applied to the load share bearing.

As indicated above the controller 140 can be part of an existing control of a machine. The control parameters received as signals 142 can be existing parameters for a machine such as engine parameters utilised for engine thrust or additional mechanical strain measurements determined within the machine, and particularly with regard to a shaft presented upon the fixed and load share bearing combination in accordance with aspects of the present invention.

The controller 140 is associated with a memory or other device to provide associations between operational stages and necessary hydraulic fluid pressure presented through the regulator 144 to the piston 141 for these operational stages. The memory comprises typically a relational map 151 which relates necessary hydraulic pressure to the operational stage as presented to the piston 141. The number of operational stages determined may be variable but as indicated above may relate to known expected conditions for machines and therefore shaft operations in accordance with aspects of the present invention. For aircraft these operational stages will include as illustrated above idle, take off, climb, cruise, descent and reverse thrust.

By aspects of the present invention as indicated capabilities are provided with regard to preferentially loading and controlling the force exerted by a load share bearing relative to a fixed bearing in a bearing combination. In such circumstances by preferential bearing loading the bearing combination can be optimised for bearing life and maximum bearing capacity. Typically with prior bearing arrangements a compromise was necessary between bearing arrangement life and maximum bearing capacity for short term or limited periods of bearing operational life.

It will also be understood that with regard prior bearing arrangements it is also necessary to provide tolerance allowance which may be up to 30% of bearing capacity. The tolerance allowances are to account for variability inaccuracy with regard to bearing load due to manufacturing tolerances and engine deterioration/transients. Such difficulties are particularly relevant when a large proportion of the end load is attributed to rotor paths and seal clearances and can seriously effect the possibility of design of a "high speed" location bearing in an inter case section. Lower speed load share bearings can easily accommodate extra load capacity and therefore it is preferable that the load share bearings provide capability with regard to adjusting the level of load compared to the fixed bearing throughout the life of the engine to achieve longer overall bearing life. Thus, as a fixed bearing wears or becomes less reliable the necessary combined bearing load capacity can be supplemented by adjusting and increasing the proportion provided by the load share bearing. In such circumstances an appropriate sensor with regard to necessary load capacity will be required but nevertheless at least within acceptable margins such supplementing for the reduction of the capacity of the fixed bearing can be accommodated. It will also be appreciated that in some circumstances it may be possible to arrange for the load share bearing to compensate at least in the short term in a "get me home" situation for a failed fixed bearing.

As indicated above the load mechanism can take a number of forms but advantageously utilises hydraulic piston pressure to provide loads to the load share bearing. The present invention avoid negative efficiency effects with regard to continuously bleeding high pressure air from a gas turbine engine to achieve a bearing load adjustment for asymmetric axial loads within a machine on a shaft. It will also be understood by combination of the fixed bearing and the load share bearing in appropriate proportions an appropriate load capacity is achieved without necessitating unacceptably large fixed bearings.

Aspects of the present invention may be utilised within any machine with a shaft or otherwise where axial thrust load control is required in order to limit the load on the main or fixed bearing without use of inefficient rotating air pressurising pistons or otherwise which may reduce overall machine efficiency. Such engines and machines may include those associated with marine applications, industrial generating plants, gas pumping stations etc.

It will also be understood aspects of the present invention may be utilised where a single high load capacity thrust or locating bearing is considered to be excessively heavy or where space constraints limit the overall diameter of such a thrust or fixed bearing. Thus, by combining a smaller fixed bearing with a load share bearing adapted in terms of proportional contribution in the combination, a more acceptable bearing arrangement is provided.

It will be appreciated within a typical gas turbine engine a number of fixed bearings and load share bearings will be provided about the circumference of a shaft in order to achieve balance in presentation of the shaft. In such circumstances the necessary hydraulic pressure applied to the load share bearing will be equalised substantially through the respective load share bearing for circumferential balance about the shaft.

As indicated above typically, fixed proportioning between the fixed bearing and the load share bearing will be established for particular situations and in particular operational stages for a bearing arrangement in accordance with aspects of the present invention. The operational stages can be well defined and limited as indicated to operational performance criteria such as cruise, take off etc as defined above or a larger plurality of operational stages defined dependent upon sensor determined conditions for a machine or shaft presented by the bearing arrangement. In such circumstances a number of fixed load valves can be presented to the load share bearing dependent upon the operational stage. Alternatively, the load value applied to the load share bearing may be variable dependent upon operational stage and sensor determined parameters with regard to operational factors. The controller may initially determine the operational stage and therefore present a set or fixed load value for that operational stage and then vary within margins the necessary load value dependent upon operational parameters determined by sensors. In such circumstances as indicated above with regard to the table defining the proportions between the fixed bearing and the load share bearing for a possible implementation with regard to aircraft proportion adjustments and variations within the percentage proportion ranges can be made as required dependent operationally determined parameters and variable. Alternatively, the controller may not have a fixed load value for the load share bearing but initially calculate a load value within the range as defined above dependent upon the operational stage determined from signals received by the controller.

Modification and alterations to aspects of the present invention will be appreciated by those skilled in the art. Thus, the arrangement and method in accordance with aspects of the present invention may be arranged to be fixed or adaptive as illustrated dependent upon wear of the fixed bearing or short term conditions. The controller may be arranged to alter the proportions provided in respect of the necessary capacity for bearing and load taken from the respective fixed bearing and load share bearing when taking collectively throughout the bearing arrangement where a number of combinations of fixed bearings and load share bearings are combined at circumferentially distributions in order to provide balance over each pairing or collectively as indicated.

It should be appreciated that in the example above the load share bearing has a significantly lower rotational speed than the fixed (intershaft) bearing. The lower rotational speed results in the load share bearing having a longer in service life were the two bearings carry the same amount of axial load at all engine conditions. By varying the proportion of total bearing load carried by the two bearings, either the easier bearing to maintain can be loaded relatively more or they may be loaded appropriately to give them the same life.

In the example described above the load share bearing enable a much greater axial load to be carried by the low pressure spool/rotor. This allows the engine to be designed without the need for compensating air pressure thrust pistons. These air pistons are notoriously difficult to seal effectively and are estimated to cost around 1% specific fuel consumption on a large commercial engine.

It should be apparent that more than one load share bearing may be incorporated on a shaft and/or more than shaft having a load share bearing.

I claim:

1. A method of operating a bearing arrangement for a shaft subject to axial loading over an operating cycle, the bearing arrangement including at least a fixed bearing and a load share bearing to act in combination to accommodate the axial load, method comprising:
   determining a stage of the operating cycle;
   determining the axial load and varying the axial load applied to the load share bearing; and
   varying the axial load applied between the load share bearing and the fixed bearing by operating a hydraulic piston operatively connected at least one dedicated pump.

2. The method of claim 1, wherein the load applied to the load share bearing is one of a plurality of fixed load values.

3. The method of claim 1, wherein the bearing arrangement incorporates a sensor to determine the stage of the operating cycle.

4. The method of claim 1, wherein there is a fixed relationship between the stage of the operating cycle and the axial load applied by the hydraulic piston.

5. The method of claim 1, wherein there is a variable relationship between the stage of the operating cycle and the axial load applied by the hydraulic piston dependent upon a sensor determining actual axial load upon the shaft.

6. The method of claim 1, wherein the method comprises the step of applying at least half of a total axial load to the load share bearing.

7. The method of claim 1, wherein two load share bearings are present on the shaft and the method comprises the step of applying at least one third of a total axial load on each of the two load share bearings.

8. The method of claim 1, wherein the varying step is performed while the bearing arrangement is installed in an aircraft engine, and the aircraft engine undergoes any one or more of the following stages ground/idle and taxi and/or take off and/or climb and/or cruise and/or descent and/or reverse thrust.

9. The method of claim 1, further comprising:
preferentially loading the load share bearing using a feedback loop, such that a differential load between the load share bearing and the fixed bearing is set for particular stages of the operating cycle.

10. The method of claim 1, further comprising:
actively controlling the hydraulic piston using a control unit that varies an amount of hydraulic pressure necessary to displace the hydraulic piston to meet axial load for a particular stage of the operating cycle.

11. A bearing arrangement for a shaft subject to axial loading over an operating cycle, the bearing arrangement comprising:
a fixed bearing;
a load share bearing that acts in combination with the fixed bearing to accommodate the axial loading; and
a hydraulic piston;
a dedicated pump operatively connected to the hydraulic piston, such that operation of the hydraulic piston varies the axial load applied between the load share bearing and the fixed bearing.

12. The bearing arrangement of claim 11, wherein the axial load applied to the load share bearing is one of a plurality of fixed load values.

13. The bearing arrangement of claim 11, wherein the bearing arrangement incorporates a sensor to determine the stage of the operating cycle.

14. The bearing arrangement of claim 11, wherein there is a fixed relationship between a particular stage of the operating cycle and the axial load applied by the hydraulic piston.

15. The bearing arrangement of claim 11, wherein there is a variable relationship between a particular stage of the operating cycle and the axial load applied by the hydraulic piston dependent upon a sensor determining actual axial load upon the shaft.

16. The bearing arrangement of claim 11, further comprising:
a feedback loop that preferentially loads the load share bearing, such that a differential load between the load share bearing and the fixed bearing is set for particular stages of the operating cycle.

17. The bearing arrangement of claim 11, further comprising:
an active control unit that is configured to vary an amount of hydraulic pressure necessary to displace the hydraulic piston to meet axial load for a particular stage of the operating cycle.

* * * * *